3,520,965
TREATMENT OF SODIUM BENZOATE
August W. Dege, Ridgewood, N.J., assignor to Tenneco Chemicals, Inc., a corporation of Delaware
No Drawing. Filed July 9, 1968, Ser. No. 743,280
Int. Cl. B29j 1/00
U.S. Cl. 264—101    5 Claims

ABSTRACT OF THE DISCLOSURE

A method for treating sodium benzoate to provide a product having a high relative density and excellent solubility characteristics. Sodium benzoate particles containing about 0.1 percent to about 2.0 percent by weight of water are compressed under a pressure in the range of about 800 pounds per square inch to 1000 pounds per square inch to form a sheet of densified sodium benzoate. The sheet of densified sodium benzoate may be heated under reduced pressure to reduce the water content to less than 0.5 percent by weight. The sheet may also be subdivided into flakes or powder.

---

This invention relates to a method of treating sodium benzoate. More particularly, it relates to a method of forming a sodium benzoate product that is characterized by a high relative density, excellent solubility characteristics, and other valuable properties.

Sodium benzoate is a widely used and accepted preservative for foods, pharmaceuticals, toiletries, and food packaging materials because of its safety, stability, solubility in water and organic solvents, ready availability, and low cost. Because the sodium benzoate flakes and powders that are available commercially have very low apparent densities, their handling, transportation, and storage costs are high. In addition these products are often slow and difficult to dissolve because the particles contain void spaces and entrapped air that cause them to float on the surface of the solvent and to agglomerate into balls that resist penetration by the solvent. Attempts to improve the physical properties of sodium benzoate flakes and powders by various known techniques have generally been unsuccessful because these procedures do not reduce the bulk of the particles to a sufficient degree without so hardening them that their solubility characteristics are adversely affected.

A process has now been developed whereby sodium benzoate flakes and powders are converted to a more desirable particle form. The products of this invention, which have improved flow properties and handling characteristics, have apparent densities that are from two to three times that of the untreated material and are relatively free of dust. Because of their higher apparent densities, these products require storage space that is about one-third to one-half as large as that required by the untreated material. The particles of the products of this invention are readily wetted, and they dissolve rapidly in water and organic solvents with little or no agitation.

In the process of this invention sodium benzoate flakes and powders that contain a small amount of water are subjected to a pressure in the range of about 800 pounds per square inch to 1000 pounds per square inch to form sheets of compacted and densified sodium benzoate which are then subdivided to particles of the desired size.

Any of the commercially available grades of sodium benzoate can be treated in accordance with the process of this invention to form products having improved physical properties. These include, for example, U.S.P. and technical grades of sodium benzoate in flaked and powdered forms.

Only a small amount of water need be present in the sodium benzoate that is to be densified by the process of this invention. The sodium benzoate generally contains from 0.1 percent to 2.0 percent by weight of water, with 0.2 percent to 0.5 percent by weight of water preferred. When less than the specified amount of water is present, the compacting procedure yields a product that contains particles that have not been densified. When the sodium benzoate that is to be densified contains from about 0.5 percent to 2.0 percent by weight of water, the densified product must be subjected to a drying step if a product that meets the specifications that have been established for sodium benzoate is to be obtained. This material is preferably dried by heating under reduced pressure. The presence of larger amounts of water in the sodium benzoate results in products that are difficult to handle and that require prolonged drying periods to remove the excess of water from them.

In the practice of this invention, sodium benzoate particles that contain the specified amount of water are subjected for a brief period of time to sufficient pressure to cause the particles to be compressed into a homogeneous sheet. The sheet is then broken into particles of the desired size.

Any commercially available compacting equipment can be used to densify sodium benzoate in accordance with the process of this invention. The compacting equipment may be, for example, a rotary press, a roller mill, a compacting mill, or a molding mill. It is generally preferred to use a compacting mill that comprises a pair of cast steel rolls which are held face to face by a calibrated high tension spring or hydraulic system. The rolls rotate in opposite directions about parallel horizontal axes with the roll surfaces at the nip moving downwardly. If a product having the desired density and solubility characteristics is to be obtained, the sodium benzoate particles must be subjected to a pressure in the range of about 800 pounds per square inch to 1000 pounds per square inch. When less pressure than about 800 pounds per square inch is applied, the product does not undergo the desired densification. When the sodium benzoate is subjected to pressures in excess of about 1000 pounds per square inch, a very hard product is obtained that dissolves slowly in water.

The temperature at which the densification is effected is not critical. For convenience, the process is generally carried out at room temperature; higher temperatures can be used without affecting the results.

Following the compression step, the densified sodium benzoate is dried if necessary to bring its moisture content to within the range that has been established for this product and then subdivided in any convenient way. A procedure that yields dust-free, granular products comprises passing sheets of the densified sodium benzoate between corrugated rolls set at a small clearance and rotating at different speeds. The corrugations may be a horizontal spiral on one roll and a vertical spiral on the other, giving a square cut between them. The sheets are fed first to the rolls which subdivide them into coarse particles and then to rolls which further reduce their size.

This invention is further illustrated by the example that follows.

EXAMPLE

In a series of tests, sodium benzoate which contained from 0.2 percent to 0.5 percent of water was introduced continuously and at a constant rate into a compacting mill. In this mill the sodium benzoate particles were subjected to pressures in the range of 800 p.s.i.g. to 1000 p.s.i.g. which caused them to be formed into homogeneous sheets. The sheets were passed into a mill in which they were broken into relatively large flakes (20 mesh to 120 mesh) or powder (80 mesh to 200 mesh). In each case the apparent density of the compacted flakes and powders was from 2 to 3 times that of the starting material.

The properties of the sodium benzoate that was used as the starting material in the process of this invention and of the densified sodium benzoate products are summarized in the table that follows.

|  | Sodium Benzoate Used As Starting Material | Densified Sodium Benzoate Products |
|---|---|---|
| Appearance | White flakes or powder. | White flakes or powder |
| Odor | Odorless or nearly odorless. | Odorless or nearly odorless. |
| Loss on drying | 1.5% max | 1.5% max. |
| Assay (dried) | 99.0% min | 99.0% min. |
| Fineness: | | |
| Flakes | 98% min. through U.S. #10 Sieve. | 98% min. through U.S. #10 Sieve |
| Powder | 98% min. through U.S. #30 Sieve. | 98% min. through U.S. #30 Sieve. |
| Specific gravity, 25°/25° C. | 1.44 | 1.44 |
| Apparent density | 15 lbs./cu. ft | 42 lbs./cu. ft. |
| (Packed flakes) | (2.5 lbs./gallon) | (6 lbs./gallon). |
| (Packed powder) | 22 lbs./cu. ft | 46 lbs./cu. ft. |
| Bulk: | | |
| Packed flakes | 95 ml./ounce | 35 ml./ounce. |
| Packed powder | 65 ml./ounce | 32 ml./ounce. |
| Space Required per 100 lbs. (ocean cube). | 9.13 cu. ft | 3.28 cu. ft. |
| Solubility in water | Dissolves slowly; requires vigorous agitation. | Wets at once; dissolves rapidly with little agitation. |

From the data in the table it will be seen that the process of the present invention yields sodium benzoate products that are far less bulky than the sodium benzoate that is used as the starting material and that are wetted more readily and dissolved more rapidly than is the starting material.

The terms and expressions that have been employed are used as terms of description and not of limitation. There is no intention in the use of such terms and expressions of excluding any equivalents of the features shown and described or portions thereof. It is recognized that various modifications are possible within the scope of the invention claimed.

What is claimed is:

1. The process of treating particles of sodium benzoate that comprises subjecting sodium benzoate particles that contain about 0.1 percent to about 2.0 percent by weight of water to a pressure in the range of about 800 pounds per square inch to 1000 pounds per square inch, thereby forming a sheet of densified sodium benzoate.

2. The process of claim 1 wherein the sodium benzoate that is compacted contains 0.2 percent to 0.5 percent by weight of water.

3. The process of claim 1 wherein the sodium benzoate that is compacted contains about 0.5 percent to 2.0 percent by weight of water and the sheet of densified sodium benzoate is heated under vacuum to reduce its water content to less than 0.5 percent by weight.

4. The process of claim 1 wherein the sheet of densified sodium benzoate is subdivided into flakes.

5. The process of claim 1 wherein the sheet of densified sodium benzoate is subdivided into a powder.

References Cited

UNITED STATES PATENTS 2,623,243  12/1952  Jean et al. _____ 264—109
3,444,287   5/1969  Kolb et al. _____ 264—109

ROBERT F. WHITE, Primary Examiner

J. H. SILBAUGH, Assistant Examiner

U.S. Cl. X.R.

264—118, 330